United States Patent [19]

Alcorn et al.

[11] Patent Number: 4,869,738
[45] Date of Patent: Sep. 26, 1989

[54] PARTICULATE TRAP

[75] Inventors: William R. Alcorn, Cleveland, Ohio; Wesley P. Bullock, Windham, Ohio; Edward M. Smith, Wyncote, Pa.; William A. Whittenberger, Garrettsville, Ohio

[73] Assignee: W. R. Grace & Co.-Conn., New York, N.Y.

[21] Appl. No.: 89,578

[22] Filed: Aug. 26, 1987

[51] Int. Cl.$^4$ .............................................. B01D 33/02
[52] U.S. Cl. ......................................... 55/267; 55/284; 55/353; 55/390; 55/401; 55/523; 55/DIG. 10; 55/DIG. 30
[58] Field of Search .................... 55/34, 60, 77, 181, 55/208, 267, 390, 400, 401, 523, 284, 285, 353, DIG. 10, DIG. 30

[56] References Cited

U.S. PATENT DOCUMENTS

| Re. 21,004 | 2/1939 | Korp | 55/390 |
|---|---|---|---|
| 2,219,547 | 10/1940 | Locke | 55/390 X |
| 2,347,829 | 5/1944 | Karlsson et al. | 55/284 X |
| 2,662,607 | 12/1953 | Moragne | 55/390 X |
| 3,140,936 | 7/1964 | Schwartz | 55/290 X |
| 3,176,446 | 4/1965 | Siggelin | 55/34 X |
| 3,423,268 | 1/1969 | Rahm et al. | 55/390 X |
| 3,607,133 | 9/1971 | Hirao et al. | 55/390 X |
| 3,757,492 | 9/1973 | Graff | 55/390 X |
| 3,847,578 | 11/1974 | Munters | 55/390 |
| 3,883,326 | 5/1975 | Wenner | 55/390 X |
| 3,965,695 | 6/1976 | Rush et al. | 55/390 X |
| 4,025,362 | 5/1977 | Frauenfeld | 134/57 R |
| 4,200,441 | 4/1980 | Hönmann et al. | 55/390 X |
| 4,228,847 | 10/1980 | Lindahl | 55/390 X |
| 4,251,239 | 2/1981 | Clyde et al. | 55/523 X |
| 4,276,066 | 6/1981 | Bly et al. | 55/523 X |
| 4,346,557 | 8/1982 | Shadman et al. | 55/523 X |
| 4,373,330 | 2/1983 | Stark | 55/284 X |
| 4,415,344 | 11/1983 | Frost et al. | 55/523 |
| 4,419,108 | 12/1983 | Frost et al. | 55/523 X |
| 4,509,966 | 4/1985 | Dimick et al. | 55/523 X |
| 4,519,820 | 5/1985 | Oyobe et al. | 55/523 X |
| 4,649,987 | 3/1987 | Frauenfeld et al. | 165/5 |
| 4,652,286 | 3/1987 | Kusuda et al. | 55/523 |
| 4,678,643 | 7/1987 | Fetzer | 422/175 |

FOREIGN PATENT DOCUMENTS

| 2615433 | 10/1977 | Fed. Rep. of Germany . | |
|---|---|---|---|
| 114716 | 6/1986 | Japan | 55/390 |
| 167427 | 7/1986 | Japan | 55/390 |
| WO85/03645 | 2/1985 | PCT Int'l Appl. . | |
| 822863 | 4/1981 | U.S.S.R. | 55/285 |

Primary Examiner—Robert Spitzer
Attorney, Agent, or Firm—Steven T. Trinker

[57] ABSTRACT

A regenerable particulate trap for continuously separating particulates from, for example, the exhaust gas from a diesel engine, is characterized by a rotatable trap member mounted for rotation in the exhaust gas stream. Disposed over the face of the rotatable trap member on the upstream side is an enclosed, stationary chamber which isolates a portion of the rotatable trap member from the exhaust gas stream and directs a regenerating fluid through the rotating trap member, co-currently to the exhaust gas stream, to continuously remove the trapped particles by, e.g. burning in an oxygen-containing gas.

28 Claims, 7 Drawing Sheets

PARTICULATE TRAP

The present invention relates, as indicated, to a trap for collecting particles from a moving fluid, and more particularly, to a particulate trap for removing fine particles from a moving gas, e.g., carbonaceous particles from diesel exhaust gases.

BACKGROUND OF THE INVENTION AND PRIOR ART

The art is replete with devices for removing solid or liquid particles from moving fluid (liquid or gas) streams ranging from filter paper and permeable solid members such as steel wool or glass wool, molybdenum fibers and ceramic fibers, to electroprecipitators, e.g., Cottrell precipitators. More recently with the growing concern over particulates in the air we breath, many developments have emerged. The present invention is principally concerned with removal of particles from exhaust gases from internal combustion and gas turbine engines.

Among the most visible offenders are diesel engines; automotive, marine, and stationary. Combustion is very often incomplete and disturbing black clouds of exhaust emanate from the exhaust stacks of such engines, particularly over-the-road trucks and buses. A considerable amount of effort has been expended to develop a satisfactory particulate trap for diesel engines. Reference may be had to commonly owned U.S. Pat. No. 4,725,411 of Richard C. Cornelison for one form of particulate trap for diesel engines.

The principal problem with prior art devices for trapping particulates has been in respect of regeneration of the trap for continued use. Use for a period of time causes the trap to become clogged with particulates, and unless the filter is to be replaced as a unit, as water filters usually are, the particulate trap or filter must undergo regeneration or flushing.

In the case of diesel exhaust particulate traps, regeneration or flushing is currently done by splitting the exhaust line at a "Y" and sending exhaust through one leg of the "Y" for particle removal, while the other leg of the "Y" is connected to a regenerating fluid, e.g., air and fuel at a temperature sufficient to "light off" the accumulated carbon. The exhaust stream is alternated between the regenerated side of the "Y" and the clogged side of the "Y" as required and then collected by a suitable header or inverted "Y" for passage out of the tail pipe.

The foregoing system is expensive and not entirely satisfactory because regeneration temperatures can reach 2400° F. due to the exothermic potential of the carbon particles. The present invention solves this problem in an especially satisfactory way for the diesel engine.

Basically, it has been found that a very satisfactory particulate trap is provided by a rotary member rotating on an axis and disposed in intercepting relation with the flow of the exhaust gas. Generally, the diameter of the rotary member is greater than the diameter of the exhaust line in which it is inserted. A first segment of the "wheel" is open to the exhaust gas containing particulates, and a smaller second segment, isolated from the first segment, is adapted to receive a regenerating material, e.g., hot air or air and fuel. As the wheel rotates through the first segment, particles of carbonaceous material suspended in the exhaust are trapped by a specially configured member. As the wheel continues its rotation, it enters the isolated second segment and undergoes regeneration whereby the entrapped carbonaceous particles are burned off the trapping members and a fresh trapping section is again presented to the contaminated exhaust gases.

The trapping member is formed from catalyzed or non-catalyzed corrugated metal, with gauze, ceramics, or high temperature composites preferably in layers. In the case of layered materials several layers of such corrugated metal, or composites, are superimposed one on the other to build up a trapping segment or member. The layers are maintained in closely spaced relation. A convenient mode for spacing the layers is to apply a coating which tightly adheres to the surface and contains distributed therethrough temperature resistant particles of substantially uniform size, e.g., stainless steel particles, or particles of alumina, or zirconia particles. Alternatively, the particles may be applied to the wet surface and cemented thereto. Such particles are preferably spherical, although irregularly shaped particles of substantially uniform size may be used. Short wire segments may also be used as a spacing material.

The fluid traverses the trapping member in a direction substantially normal to the corrugations. The corrugations cause periodic rapid changes in the direction of the fluid and result in the particles dropping out of the fluid stream and being stored on the prepared surfaces of the trap material.

BRIEF STATEMENT OF THE INVENTION

Briefly stated, the present invention is in a co-current trap for continuously separating particulates from a fluid stream. The device comprises a rotatable particle trap member through which the fluid flows, and having upstream and downstream sides. It is mounted for rotation on an axis in substantial alignment with the direction of fluid flow. There is provided a stationary conduit confronting the rotatable trap member on the upstream side and which conduit is isolated from the particle-containing fluid. It is for co-currently directing a regenerating fluid through a portion of said trap during rotation thereof to continuously regenerate the trap by removal of the particles collected therein.

BRIEF DESCRIPTION OF THE DRAWINGS

The invention may be better understood by having reference to the annexed drawings wherein.

DETAILED DESCRIPTION OF THE DRAWINGS

As indicated above, the present device is for removing particulate matter having a particle size generally 1 micron or less, e.g., 0.01 to 1.0 micron from a flowing fluid stream. Normally, the stream is gaseous although the principles hereof apply as well to liquid streams. The invention will be described from this point forward in relation to gaseous streams containing solid micron and submicron size particulate matter, and especially diesel exhaust gases containing carbonaceous particles. The present device is a rotary particle trap. The trap member is a series of corrugated metal portions, preferably formed of stainless steel, held in a closely spaced relation by cementing, for example, or by a retaining ring or other suitable means. The spacing is determined by uniformly sized particles deposited on and adhered to the confronting surfaces of the corrugated metal. In general, these particles have a particle size of from 0.010 to about 0.050 inch, and are quite uniform in size. In other words, the size selection is closely controlled as by screening over a short range of screen sizes. In the course of its rotation the particle trap is exposed to the particle-containing gas for the major part of its rotation, e.g., 60% to 80% of its rotation, and for the balance of its rotation to a regenerating material, e.g., hot air or air and fuel at about 1200° F. As will be explained below, the regenerating zone is defined by a suitable dam or baffle which is stationary relative to the rotating wheel. Thus each segment of the wheel is exposed to the particle containing gas for a major part of its revolution and to the regenerating gas, for example air, or an air-fuel mixture to burn off the carbon, for a minor part of its revolution. The revolving trap member is, therefore, loaded with particulate and regenerated once each revolution. It will be seen that low rotation speeds lead to higher particle loading and higher regeneration exotherms; high rotation speed gives the opposite effect.

Thus, both trap design and rotation speed determine the actual trapping efficiency and maximum temperature of a system for a specific exhaust stream.

The foregoing mode of operation is far simpler and less expensive than the alternating system of the prior art, and provides a continuous operation without the necessity of a control valve. Although in the preferred case, the size of the regeneration zone is fixed, temperature control may also be accomplished by varying the rate of flow of the regenerating gas, altering the speed of wheel rotation, or by altering the size of the segment exposed to the regenerating gas. Too rapid burning of the accumulated carbon can destroy the apparatus or necessitate the use of costly, high temperature materials.

Figure 1:
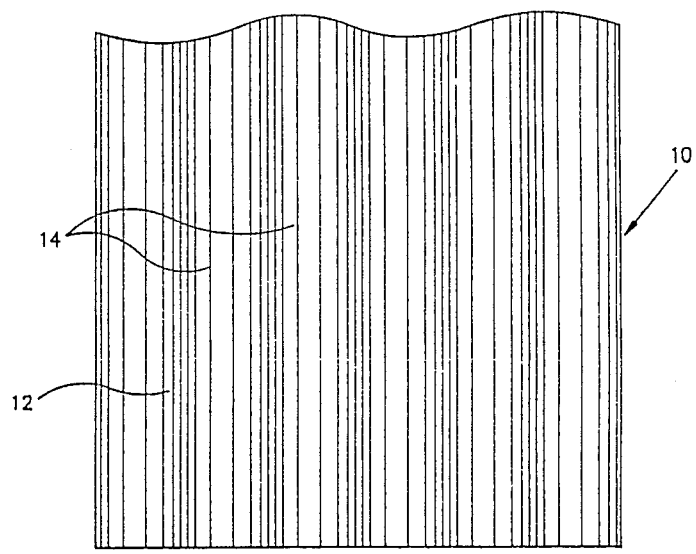
FIG. 1 is a partial plan view of a corrugated strip from which the trap segments of the present invention are fabricated. The crowns and grooves of the corrugations are desirably parallel to the longitudinal axis of the strip.
Figure 2:
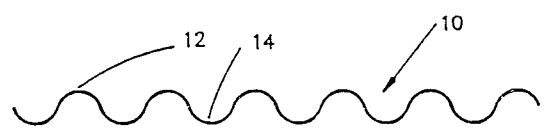
FIG. 2 is an end view of the corrugated strip shown in FIG. 1.

Referring now more particularly to the drawings, in FIGS. 1 and 2 there is shown a portion of a corrugated sheet 10 having peaks 12 and valleys 14 in parallel relation to the longitudinal axis of the strip, and similar in appearance to an ordinary corrugated metal or plastic sheet used as a roofing material. This member is, however, desirably formed from stainless steel that is from 0.0015" to about 0.008" thick and preferably about 0.0025" thick. The pitch of the corrugations is generally in the range of from 0.05" to about 0.175", and preferably about 0.085". The depth of the corrugations is about 40% of the pitch, e.g., 0.02" to about 0.070, and preferably about 0.034". When the device is to be used in an exhaust line from a diesel engine, it must be formed of stainless steel because the temperature of regeneration will often be higher than normal exhaust temperature. Any other metal, unless it is an unduly expensive material, will fail under these conditions. Where the device is to be used as a particulate trap in a chemical operation where the temperatures are much lower, other lower temperature withstanding material suitably adhered to the surface may be used as a spacer material.

Figure 3:
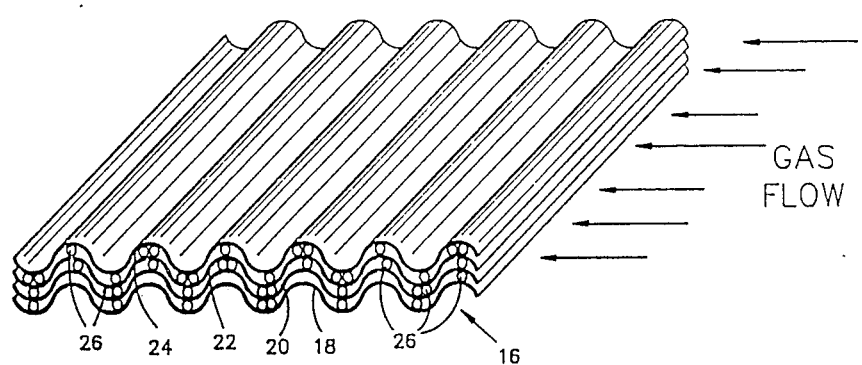
FIG. 3 is an isometric view of a plurality of corrugated strip portions in nested spaced relation showing the direction of fluid flow through the member.

FIG. 3 shows a fragment of a particulate trap member 16 composed of four layers 18, 20, 22, and 24 of the type shown in FIGS. 1 and 2. The layers 18, 20, 22 and 24 are held in spaced relation by temperature resistant particles of substantially uniform size. In general, these particles have a diameter which is about the same as the corrugation depth, e.g., 0.02" to 0.07". Such particles may be stainless steel spheres, or alumina spheres, silica sand or other refractory particles. These particles may be dispersed in a "wash coat" of alumina, alumina gel or mixtures thereof or mechanically deposited between successive layers. Such "wash coats" are well known in the exhaust catalytic converter art. They define the layer thickness and protrude from the "wash coating" being of larger dimension than the thickness of the wash coat, which is about, 0.0002" to 0.005" thick and heated after application to a temperature of about 800° F. for 0.01–0.3 minute to tightly bond the coating and the particles to the corrugated metal, e.g., layer 18. A pigment-volume concentration of less than 10%, and preferably from about 1% to about 3% of the spacer elements 26 in the wash coat is satisfactory. Alternatively, the spacing particles may be mechanically applied.

The "wash coat" also provides a suitable receptor for catalytically active agents such as platinum, palladium, rhodium or mixtures thereof, for converting pollutants such as carbon monoxide, unburned hydrocarbon, $NO_x$, etc., to environmentally acceptable materials such as $CO_2$, $H_2O$, $N_2$, etc. Thus, the particulate traps hereof may also serve as catalytic converters. A mode for applying a catalyst receptive surface is described in commonly owned U.S. Pat. No. 4,711,009.

Also, shown in FIG. 3 is the direction of the gas flow. It is generally perpendicular to the direction of the corrugations. As the gas flows between the layers of corrugated metal, e.g., layers 18–20, it undergoes rapid changes in direction. This causes the particles carried in suspension in the gas stream to impact and deposit on the surface of the corrugated metal sheet, e.g., layers 18 and 20. The calcined "wash coat" provides a roughened surface to aid in adhesion of the particles, e.g., carbon particles, to the surface. The amount of spacer particles is insufficient to affect materially the flow of the gas through the trap member 16. The free space through the trap member generally ranges from about 90% to about 60%. The juxtaposed corrugated plates for example, 18, 20, 22 (FIG. 3) must be properly spaced. If they are too close, the effect is essentially the same as parallel plates. If they are too far apart, the desired trapping effect is greatly diminished and approaches 0. If "s" is considered to be the space between the layers, e.g., layers 18 and 20 in FIG. 3 and h is the vertical altitude of the corrugation between the peak and the valley, the best relationship of s to h is expressed by s/h, and in general s/h equals≃0.2 to 1.2, preferably, from 0.5 to 0.8. Thus, the successive juxtaposed layers are partially nested in the preferred embodiments. We believe, although we do not wish to be bound by any theory of operation, that the particles moving between properly spaced plates, e.g., 18 and 20 in FIG. 3, undergo a change in direction and the particles, which tend to continue in a straight path, impact the surface and adhere thereto.

Figure 4:
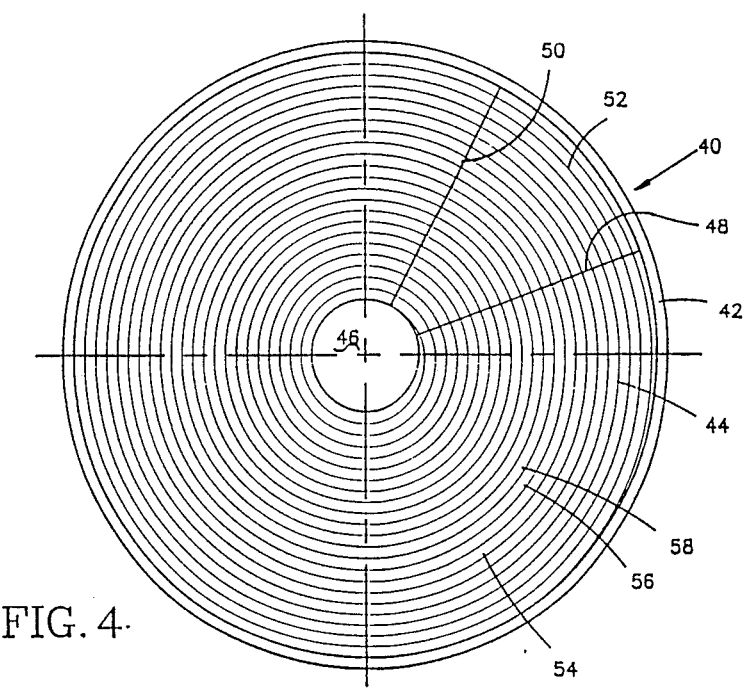
FIG. 4 is a top plan view of a rotatable member wherein the corrugated strip of FIG. 1 is wound in spiral form, and the convolutions are maintained in spaced relation by a particle containing coating on both sides thereof. Also shown in FIG. 4 is the regenerating segment of the rotary member, better shown in FIG. 8.
Figure 8:
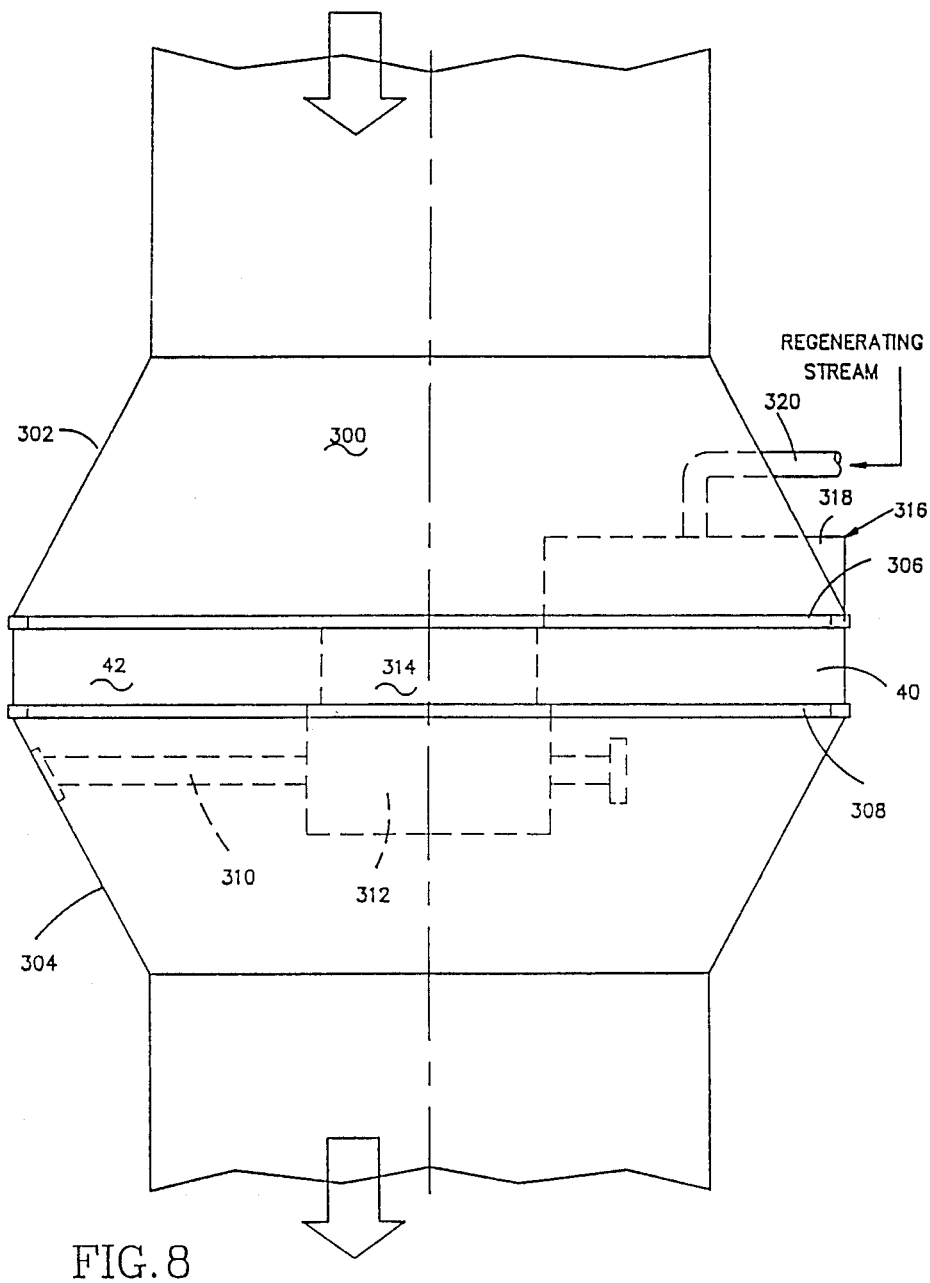
FIG. 8 is a fragmentary side elevation of an exhaust line insert showing the rotatable member, the adaptors therefor, the drive means for rotating the member, and the stationary regenerating duct for conducting regenerant to the upstream side of the particle trap member.

FIG. 4 shows a top plan view of a rotary trap member 40 as it appears in the plane indicated by the line 4—4 in FIG. 8. There is provided an outer rim 42 which is dimensioned to contain a spirally wound core 44 formed from a strip of the corrugated thin metal such as shown in FIGS. 1 and 2. Because of the resistance to coiling, the hub 46 is of relatively large diameter. The hub 46 is a drive member directly attached to a drive motor shown in FIG. 8 for rotating engagement with the trap element 40.

Also shown in FIG. 4 are the sides 48 and 50 which define the regeneration zone 52. The balance 54 of the rotary member 40 is the trapping zone or collection zone 54. The convolutions, e.g., convolutions 56 and 58, are, as indicated above, maintained in uniformly spaced relation by the interposition of spacing spheres 26 (FIG. 3) not shown in FIG. 4 and applied to both surfaces of the metal strip as above described. As the rotary member 40 revolves every portion thereof is exposed for a predetermined length of time to the regenerating gas, for example, hot air, and after having the collected carbon burned off, revolution carries the regenerated portion 52 back into the collection zone 54 which is directly exposed to the exhaust gas stream, for further trapping of particles. The sides 48 and 50 are shown at a 45° angle. The magnitude of the regeneration zone must be determined empirically as this dimension will depend upon many factors such as the particle collection time, the burn off time, foil geometry, fuel used, the size of the engine, the load under which it normally operates, etc. The angle of the sides 48 and 50 will vary, therefore, although in most cases it will fall between 20° and 60°.

Figure 5:
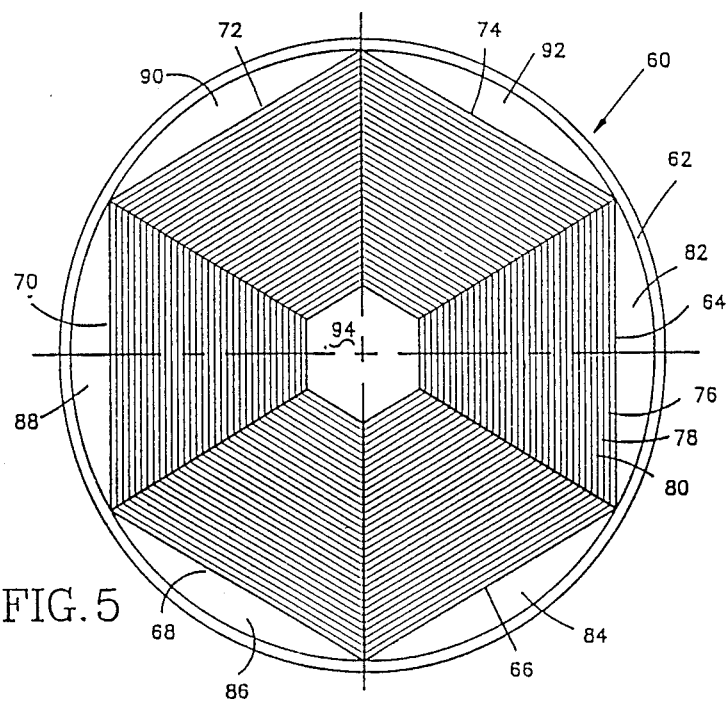
FIG. 5 shows a top plan view of another form of rotatable member formed from a plurality of frusto-prismatic elements defining a hexagonal insert in a ring adapted to be mounted for rotation.

FIG. 5 shows another form of rotary member 60 having an encircling rim 62. Contained within the rim 62 are six frusto-prismatically shaped, built-up trapping members 64, 66, 68, 70, 72, and 74. In this embodiment, the members, e.g., member 64, is built up of a series of layers, e.g., layers 76, 78, and 80 cut from a straight sheet or corrugated metal, such as shown in FIG. 1 and of decreasing length. The several layers, e.g., 76, 78, and 80, may be assembled and welded or cemented together into the desired shape with the spacer elements 26 in place as shown in FIG. 3.

Because of the noncircular configuration of the assemblage of elements 64, 66, 68, 70, 72, and 74, the arcuate segments between the rim 62 and the respective elements, e.g., element 64, must be filled with fillets 82, 84, 86, 88, 90, and 92 so that the gases will be forced through the corrugated metal elements, e.g., element 64.

The central hub 94 is configured and dimensioned to occupy the central space defined by the frusto-prismatic members 64, 66, 68, etc. again to force the gases to pass through the trap elements 64, 66, 68, 70, 72, and 74. The central hub 94 is drivingly engaged with drive means, e.g., the drive motor 312 in FIG. 8.

Figure 6:
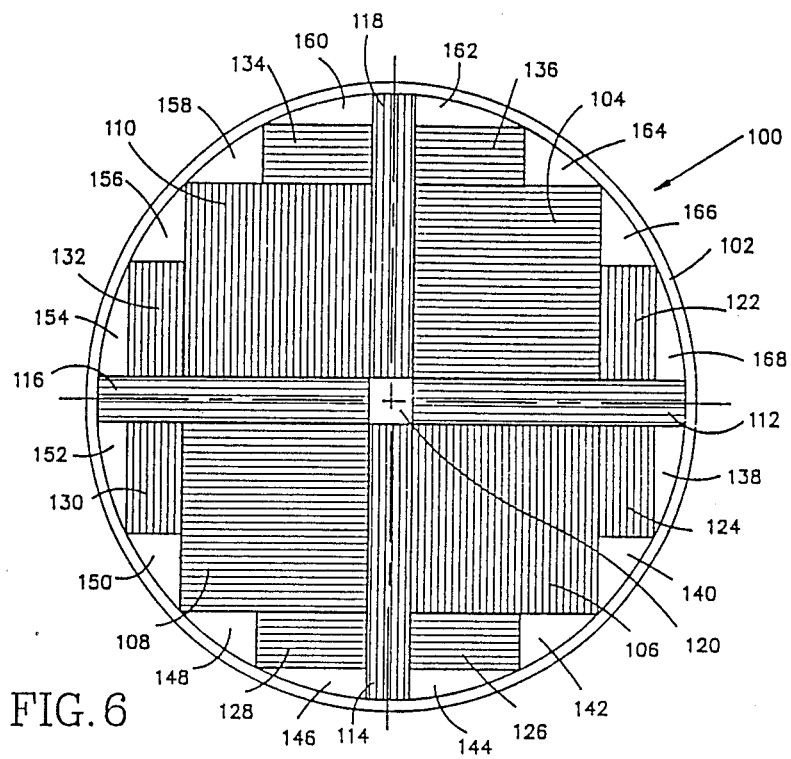
FIG. 6 shows a top plan view of another form of rotatable member.

FIG. 6 is a top plan view of another embodiment of a rotary trap member 100 having an outer retaining ring 102. A different configuration of the elements is utilized in order to make a more efficient use of a circular member with rectangular trap elements. Thus, there are provided four square trap members 104, 106, 108, and 110 built up in a manner similar to the frusto-prismatic members shown in FIG. 5. Intermediate rectangular members 112, 114, 116, and 118 are elongated and lie between the members 104, 106, 108, and 110, respectively, and extend from the central position 120 to the rim 102. The central portion 120 is a square hub 120 and is directly attached to drive means, e.g., the drive motor 312 shown in FIG. 8. Fill-in trap elements 122, 124, 126, 128, 130, 132, 134, and 136 are also of rectangular configuration and partially fill the otherwise free space. In the manner shown above for the trap of FIG. 5, there are provided fillets 138, 140, 142, 144, 146, 148, 150, 152, 154, 156, 158, 160, 162, 164, 166, and 168 to force the gases to pass through the trap and regeneration elements.

Figure 7:
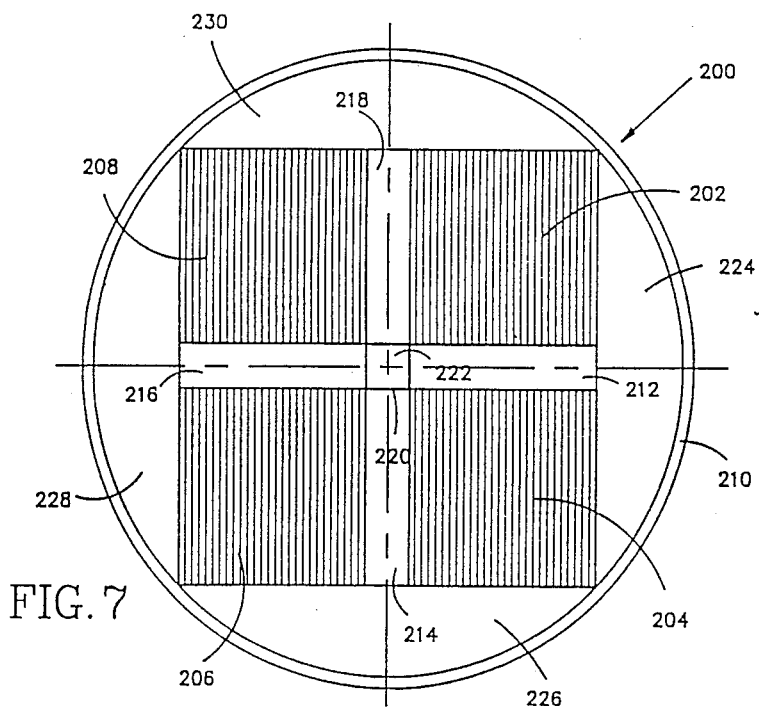
FIG. 7 shows a top plan view of still another form of rotatable member.

FIG. 7 is an illustration in plan view of yet another embodiment of particulate trap 200 in accordance herewith. In this case, there is shown a set of four square built-up trap elements 202, 204, 206, and 208 confined within a circular rim 210. Gas impermeable members 212, 214, 216 and 218 are disposed between the square trap elements and define at their inner ends a square hole 220 adapted to receive a square drive shaft 222 which is connected to drive means, e.g., the drive motor 312 shown in FIG. 8. The open segments between the trap elements 202, 204, 206, and 208 and the rim 210 are filled with suitable gas impermeable fillets 224, 226, 228, and 230. The fillets may be integral with the elongated elements 212, 214, 216, and 218. As before, the fillets are for the purpose of forcing the gases to pass through the trap elements 202, 204, 206, and 208.

FIG. 8 shows in partial side elevation, a rotary particulate trap 40, such as shown in FIG. 4, mounted for rotation in an exhaust line 300, partially shown. The exhaust line 300 is provided with an inlet adapter 302 and an outlet adapter 304. The inlet adapter 302 is provided with a lip 306 having a diameter larger than the diameter of the rim 42 of the rotary member 40 by an amount sufficient to permit rotation of the rotary member 40, without allowing the escape of gases. Any suitable seal (not shown) may be provided between the lip 306 and the rotary member 40. At the opposite end, the inlet adapter 302 is reduced in diameter so as to connect to the normal exhaust line, not shown.

The downstream side of the rotary member 40 is fitted with an outlet duct or adapter 304. In like manner, a lip 308 is provided for sealing coaction with the rotary trap member 40 as described above. The outlet adapter 304 is provided with an internal spider 310 attached by any suitable means, e.g., welding, to the wall of the adapter 304 for the purpose of supporting the drive motor 312. The drive motor 312 is preferably a variable speed motor, and may be controlled by computer and related to load, engine speed, particle content, temperature of the exhaust, etc. The motor 312 is provided with a hub 314 adapted to fit into the central portion of the rotary trap member 40 and drivingly engaged therewith. Any suitable drive means may be employed to rotate the member 40 including, for example, an external motor and a chain drive (not shown).

Also, shown in FIG. 8 is the regenerating duct 316 which is isolated from the exhaust stream by an enclosed chamber 318. An inlet 320 for regenerating gas and leading from the outside of the inlet adapter 302 is provided for conducting regenerating gas into the chamber 320. This is usually hot air or hot inert gas in the case of chemically active particles which it is desired to recover. The regenerating gas flows in the same direction through the trap as the exhaust gas so that the products of regeneration, usually carbon dioxide, are recombined with the exhaust and exit from the system in the usual manner. The regenerating operation is highly exothermic where carbon is the particulate being trapped and careful temperature control is necessary to prevent "burn out" of the rotary trap unit. Temperature monitoring means (not shown) but well known to those skilled in the art are utilized to assure that the temperature within the regenerating zone is properly controlled.

Figure 9:
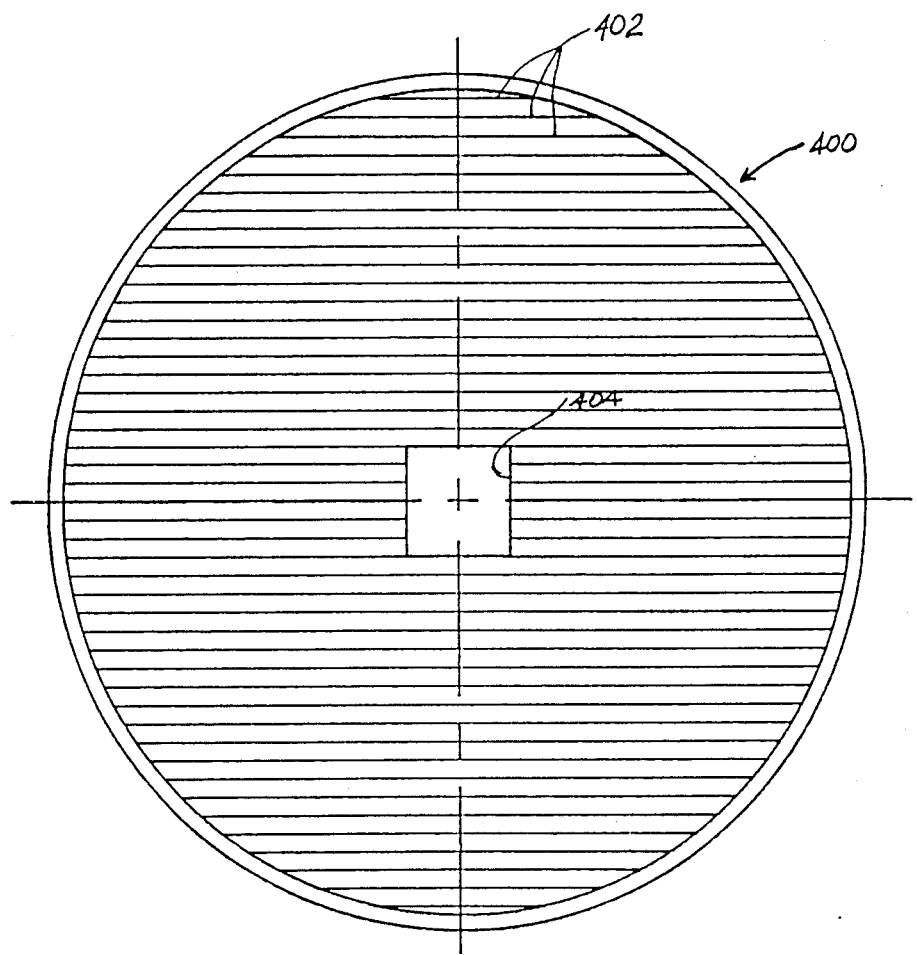
FIG. 9 shows another top plan view of a rotatable member.

FIG. 9 is a preferred form of particulate trap 400 in accordance herewith. In this case, chordal segments 402 of corrugated material are disposed in parallel relation to fill the entire cross-section of the rotary element 400. A rectangular opening 404 is provided for attachment of a suitable drive shaft (not shown) to effect rotation of the trap 400.

While the device described above are quite effective in removing particulates, particularly from diesel engine exhaust, it may be found more effective to provide a foraminous member in the rotatable member to remove submicron particles. The term "foraminous" as used herein means that the passages through the particle trap member are very fine, fluid permeable, and thus capable of entrapping submicron or colloidal solid particles from the fluid stream. Ceramic monoliths, ceramic foam, metal gauze in layers, metal wool tightly compacted in a given space, etc., may be used as foraminous materials. This invention also contemplates composite trapping elements including both the trapping elements such as shown in FIG. 3 and those shown in FIGS. 10 and 14.

Figure 10:
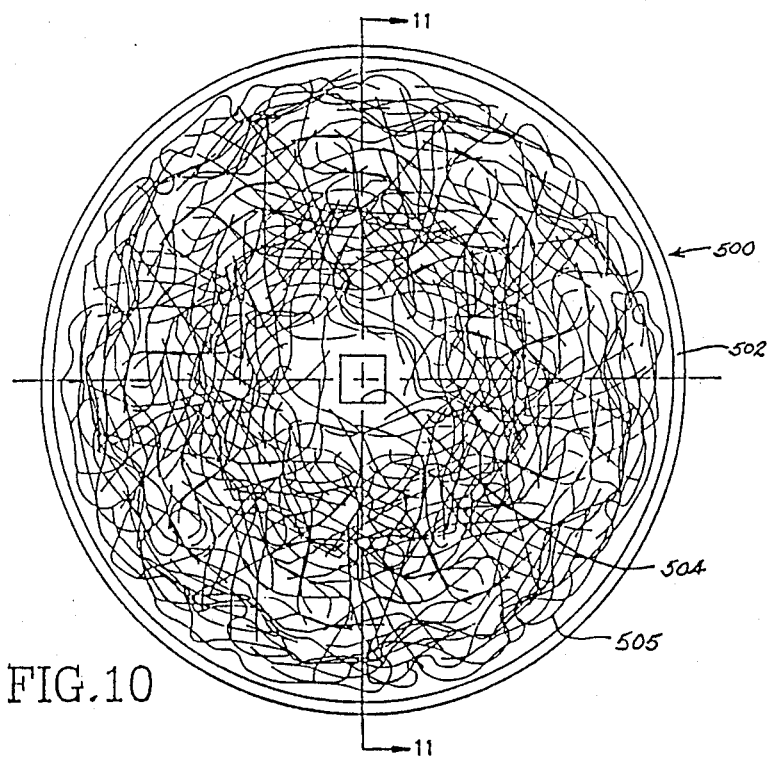
FIG. 10 is a cross-sectional view taken in the plane indicated by the line 10—10 in FIG. 11 showing a wire wool filler for the rotating wheel.
Figure 11:
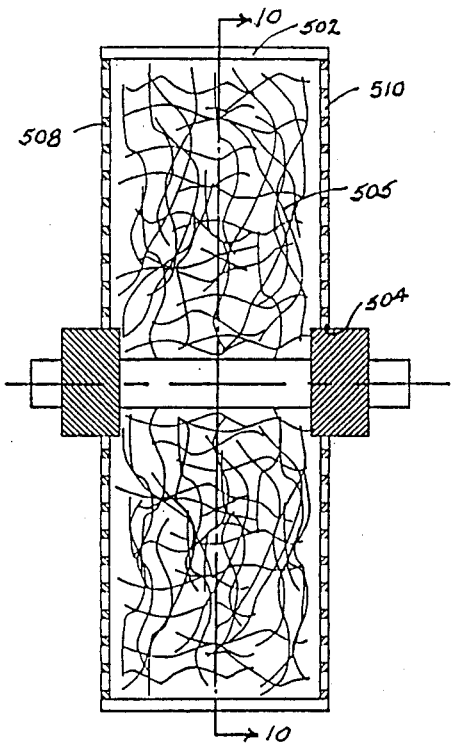
FIG. 11 is a cross-sectional view taken in the plane indicated by the line 11—11 in FIG. 10.

Referring now to FIGS. 10 and 11, there is here shown in circumferential cross-section (FIG. 10) and diametral cross-section (FIG. 11) another form of rotary trap in accordance with the present invention. In this case, the trapping material is wire wool and wire gauze. Thus, there is shown in FIG. 10, a rotary trap member 500 having a circumferential ring 502 and a hub 504 for attachment of drive means, not shown. The space between the ring 502 and the hub 504 is filled with a wire wool 505, e.g., stainless steel wool or wire gauze. The filler may be wash coated with alumina and fired, and catalyst(s) for conversion of gaseous pollutants impregnated into the surface, if desired. In order to hold the wire wool in place, perforated circular plates 508 and 510 are provided. These can be welded to the ring 502. The perforated plates 508 and 510 are provided with suitable square openings 504 (FIG. 10) for supporting the device 500 on the drive shaft (not shown).

Figure 12:
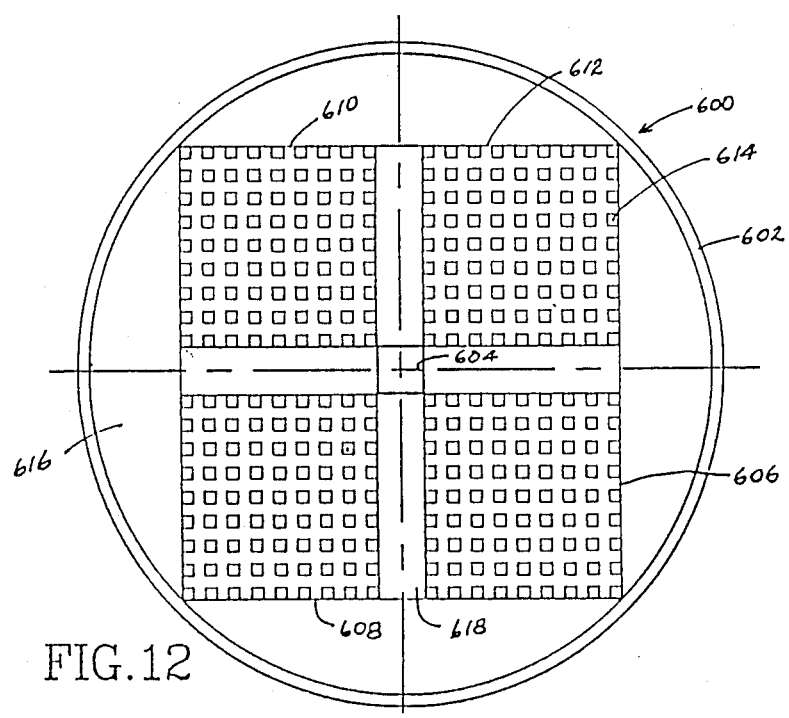
FIG. 12 is a top plan view of another form of rotary particulate trap in accordance herewith using ceramic monoliths as the trapping elements.

FIG. 12 shows another form of rotary trap member 600 having a circular rim 602 and a central hub 604. The trapping elements 606, 608, 610, and 612 are typical ceramic monoliths currently used in conventional diesel traps. In these devices, alternate channels 614 are plugged in order to force the exhaust through the wall of the ceramic filter to abstract very fine particles from the exhaust stream. Filler portions, e.g., portions 616 and 618 are provided to fill in the spaces between the rim 602 and the monoliths, e.g., 608 and 610, and to fill in the space between monoliths, e.g., monoliths 606 and 608, to force the exhaust gas through the ceramic monoliths.

Figure 13:
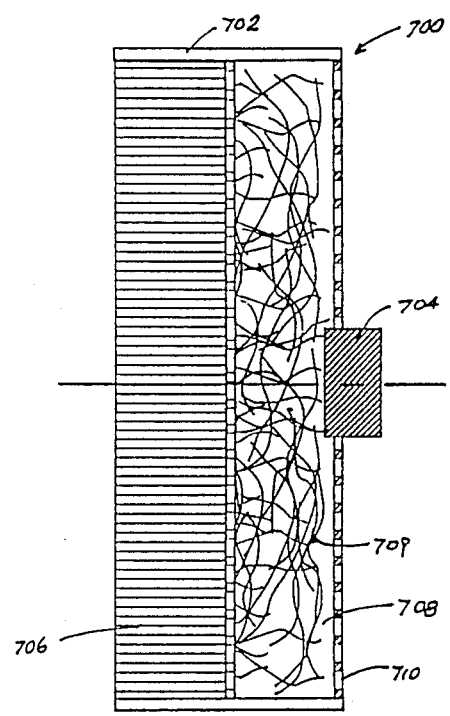
FIG. 13 is a diametral cross-sectional view of a rotary trap member in accordance with the present invention showing a composite structure, a portion of which is a corrugated metal structure and a portion of which is a wire wool. A perforated plate is provided to maintain the wire wool in place.

FIG. 13 shows in diametral cross-section still another form of rotary trap member 700 in accordance with the present invention. This is a composite device having both the corrugated metal trapping structure which is most effective in trapping larger particle of carbonaceous material, and the metal wool, which is most effective in trapping extremely fine particles of submicron size. Thus, there is shown in FIG. 13 a trap member 700 having a circumferential rim 702 and a hub 704 for engagement with a drive shaft (not shown) for effecting rotation of the device. The left hand portion 706 as shown in FIG. 13 is formed of corrugated metal, or corrugated metal sections in any suitable form such as the forms shown in FIGS. 4–7 and 9. The right hand portion 708 is filled with one of the fine particle trapping structures such as shown in FIGS. 10, 11 and 12, for example stainless steel wool 709. A perforated plate 710 is provided for holding the wool 709 in the chamber 708.

Figure 14:
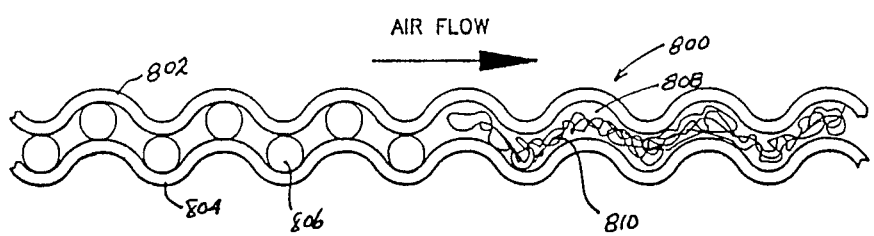
FIG. 14 is a fragmentary view of a pair of corrugated metallic members in juxtaposition, a portion being of the structure shown in FIG. 3, and a portion being filled with wire wool.

FIG. 14 shows another form of trapping structure 800 of the composite type. Here there are shown two corrugated members 802 and 804 maintained in spaced relation by particles 806 as described in connection with FIG. 3. A portion 808 of the space between the corrugated members 802 and 804, e.g., one half the longitudinal space, is filled with a metal wool 810, e.g., stainless steel wool. As indicated above, the wool 810 may be treated so as to have a catalytic conversion effect on gaseous pollutants contained in the exhaust passing therethrough. Likewise, the corrugated section may optionally be treated so as to have both the catalytic conversion effect and the particulate trapping effect.

The structures shown in FIGS. 10–14 are regenerated during a portion of each revolution in the same manner as described above.

Other configurations of layers and composite structures may be employed and are within the scope of the present invention.

There has thus been provided an improved particulate trap especially suited for trapping carbon particles contained in diesel engine exhaust and which is characterized by continuous trapping and regeneration.

What is claimed is:

1. A regenerable particulate trap for continuously separating particulates from a fluid stream, comprising:

(a) an annular housing having an inlet and an outlet which defines a conduit for passage of said fluid stream through said trap;
(b) a rotatable particulate trap member having upstream and downstream faces mounted in said housing for rotation on an axis in alignment with the direction of fluid flow, said rotatable trap member comprising a spirally wound longitudinally corrugated sheet metal strip wherein successive convolutions of said spirally wound trap member are maintained in spaced relation by hard particles of predetermined size adhered to the confronting surfaces of said convolutions;
(c) means for rotating said rotatable particulate trap member within said housing;
(d) an enclosed, stationary chamber mounted within said housing and disposed over the upstream face of the rotatable trap member which isolates a portion of said upstream face of said rotatable trap member from said fluid stream and which directs a regenerating fluid through the rotatable trap member, co-currently to the flow of said fluid stream, for continuously regenerating said trap by particulates trapped therein; and
(e) means for feeding said regenerating fluid into said enclosed, stationary chamber.

2. A regenerable particulate trap as defined in claim 1 wherein said particulates are removed from said trap by oxidation.

3. A regenerable particulate trap as defined in claim 1 including means for regulating the speed of rotation of said trap member.

4. A regenerable particulate trap as defined in claim 1 including means for controlling the temperature of said regenerating fluid.

5. A regenerable particulate trap as defined in claim 1 including means for controlling the composition of the regenerating fluid.

6. A regenerable particulate trap as defined in claim 1 wherein the fluid stream is gas.

7. A regenerable particulate trap as defined in claim 6 wherein the gas is exhaust gas from an internal combustion engine.

8. A regenerable particulate trap as defined in claim 6 wherein the gas is exhaust gas from a diesel engine.

9. A regenerable particulate trap as defined in claim 1 wherein the particulates are carbon particles.

10. A regenerable particulate trap as defined in claim 1 wherein the sheet metal strip is formed from stainless steel.

11. A regenerable particulate trap as defined in claim 10 wherein the sheet metal strip is formed from stainless steel foil having a thickness of from 0.003 to 0.010 inch.

12. A regenerable particulate trap as defined in claim 11 wherein the foil is provided with a thin wash coat containing alumina.

13. A regenerable particulate trap as defined in claim 12 wherein the alumina coat is impregnated with one or more pollutant removing catalysts.

14. A regenerable particulate trap as defined in claim 12 wherein the hard particles which maintain said successive convolutions of said spirally wound trap member in spaced relation are dispersed in said wash coat.

15. A regenerable particulate trap as defined in claim 14 wherein the hard particles are stainless steel spheres having a predetermined diameter.

16. A regenerable particulate trap as defined in claim 14 wherein the hard particles are ceramic spheres having a predetermined diameter.

17. A regenerable particulate trap as defined in claim 14 wherein the hard particles are refractory metal oxide particles of a predetermined uniform size.

18. A regenerable particulate trap as defined in claim 14 wherein said hard particles are disposed between said successive convolutions of said spirally wound trap member at an upstream portion of said trap member and a metal wool is disposed between said successive convolutions at a downstream portion of said trap member.

19. A trap for continuously separating carbonaceous particulates contained in the exhaust gas of an internal combustion engine, comprising:
(a) an annular housing having an inlet and outlet which defines a conduit for passage of said exhaust gas through said trap;
(b) a rotatable particulate trap member having upstream and downstream faces mounted within said housing for rotation on an axis in intercepting relation with the flow of exhaust gas, said member comprising laminae of partially nested corrugated thin metal foil portions arranged so that gas flows in a direction normal to the direction of the corrugations, said metal foil portions being maintained in predetermined spaced relation by relatively large particles, stable in the exhaust environment and having a substantially uniform size, disposed between the surfaces of said metal foil portions;
(c) means for rotating said rotatable particle trap member within said housing;
(d) an enclosed, stationary chamber mounted within said housing and disposed over the upstream face of the rotatable trap member which isolates a portion of said upstream face of said rotatable trap member from said exhaust gas and which directs an oxygen-containing fluid gas optionally containing a fuel through the rotatable trap member, co-currently to the flow of said exhaust gas, for continously regenerating said trap by burning off trapped carbon; and
(e) means for feeding said oxygen-containing gas into said enclosed, stationary chamber.

20. A trap for continuously separating particles as defined in claim 19 wherein the internal combustion engine is a diesel engine.

21. A trap for continuously separating particulates as defined in claim 19 wherein the thin metal foil portions are segments of a spirally wound trap body.

22. A trap for continuously separating particulates as defined in claim 19 wherein the surfaces of the corrugated metal foil portions have a coating formed thereon from an alumina-containing wash coat.

23. A trap for continuously separating particulates as defined in claim 22 wherein the coating also has deposited thereon a catalyst.

24. A trap for continuously separating particulates as defined in claim 23 wherein the catalyst includes palladium.

25. A trap for continuously separating particulates as defined in claim 24 wherein the catalyst includes rhodium.

26. A trap for continuously separating particulates as defined in claim 24 wherein the catalyst includes platinum.

27. A trap for continuously separating particulates as defined in claim 19 which is further characterized by means for controlling the speed of rotation of said trap member.

28. A trap for continuously separating particulates as defined in claim 19 which is further characterized by means for controlling the temperature of said oxygen-containing gas.

* * * * *